US011620787B2

(12) United States Patent
Kantar et al.

(10) Patent No.: US 11,620,787 B2
(45) Date of Patent: *Apr. 4, 2023

(54) SYSTEMS AND METHODS FOR ASSET GENERATION IN IMMERSIVE COGNITION ASSESSMENTS

(71) Applicant: Roblox Corporation, San Mateo, CA (US)

(72) Inventors: Rebecca Kantar, Truro, MA (US); Richard Wainess, Van Nuys, CA (US); Erica L. Snow, Fishers, IN (US); Matthew A. Emery, Vancouver (CA); Jared Lafer, New York, NY (US); Ramsey Jones, Seattle, WA (US)

(73) Assignee: Roblox Corporation, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/165,628

(22) Filed: Feb. 2, 2021

(65) Prior Publication Data

US 2022/0012938 A1    Jan. 13, 2022

Related U.S. Application Data

(63) Continuation of application No. 16/449,259, filed on Jun. 21, 2019, now Pat. No. 10,909,746.

(Continued)

(51) Int. Cl.
*G06T 15/10*  (2011.01)
*G06T 7/35*  (2017.01)
*G06N 3/04*  (2006.01)
(Continued)

(52) U.S. Cl.
CPC .......... *G06T 15/10* (2013.01); *G06N 3/0481* (2013.01); *G06T 7/35* (2017.01); *G06T 7/50* (2017.01);
(Continued)

(58) Field of Classification Search
CPC .......... G06T 15/04; G06T 15/10; G06T 7/35; G06T 17/20; G06T 2200/08; G06T 7/50;
(Continued)

(56) References Cited

U.S. PATENT DOCUMENTS

2005/0094879 A1    5/2005  Harville
2012/0200667 A1*   8/2012  Gay ...................... A63F 13/20
                                                          348/43

(Continued)

OTHER PUBLICATIONS

Lin, Chen-Hsuan, Chen Kong, and Simon Lucey. "Learning efficient point cloud generation for dense 3d object reconstruction." proceedings of the AAAI Conference on Artificial Intelligence. vol. 32. No. 1. 2018. (Year: 2018).*

(Continued)

*Primary Examiner* — Daniel F Hajnik
(74) *Attorney, Agent, or Firm* — IP Spring

(57) ABSTRACT

Systems and methods for generating a three-dimensional reconstruction from a two-dimensional image of an asset are described. In some aspects, at least one computer hardware processor is used to perform: receiving a two-dimensional input image of an asset; encoding, using a first statistical model, the input image into a latent vector; and generating, using a second statistical model, at least one depth image from the latent vector, wherein pixel values in the at least one depth image correspond to coordinates of a point cloud.

20 Claims, 13 Drawing Sheets

Related U.S. Application Data

(60) Provisional application No. 62/801,614, filed on Feb. 5, 2019, provisional application No. 62/688,963, filed on Jun. 22, 2018.

(51) Int. Cl.
  *G06T 17/20* (2006.01)
  *G06T 15/04* (2011.01)
  *G06V 10/75* (2022.01)
  *G06T 7/50* (2017.01)
  *G06V 20/64* (2022.01)

(52) U.S. Cl.
  CPC .............. *G06T 15/04* (2013.01); *G06T 17/20* (2013.01); *G06V 10/757* (2022.01); *G06V 20/647* (2022.01); *G06T 2200/08* (2013.01); *G06T 2207/20084* (2013.01)

(58) Field of Classification Search
  CPC ........ G06T 2207/20084; G06K 9/6211; G06K 9/6271; G06N 3/0481; G06N 3/0454; G06N 3/0472; G06N 3/082; G06V 10/757; G06V 10/82; G06V 20/647
  See application file for complete search history.

(56) References Cited

U.S. PATENT DOCUMENTS

| | | |
|---|---|---|
| 2019/0045317 A1 | 2/2019 | Badhwar et al. |
| 2019/0378330 A1 | 12/2019 | Sun et al. |
| 2020/0104990 A1 | 4/2020 | Kimura et al. |
| 2020/0151442 A1 | 5/2020 | Singh et al. |
| 2021/0264234 A1 | 8/2021 | Paris et al. |
| 2022/0284677 A1 | 9/2022 | Meeh et al. |

OTHER PUBLICATIONS

Smith, Edward, and David Meger. "Improved Adversarial Systems for 3D Object Generation and Reconstruction." arXiv preprint arXiv:1707.09557 (2017). (Year: 2017).*

Heljakka, Ari, Arno Solin, and Juho Kannala. "Pioneer Networks: Progressively Growing Generative Autoencoder." arXiv preprint arXiv:1807.03026 (2018). (Year: 2018).*

USPTO, Notice of Allowance mailed for U.S. Appl. No. 16/449,259, dated Sep. 30, 2020, 19 pages.

\* cited by examiner

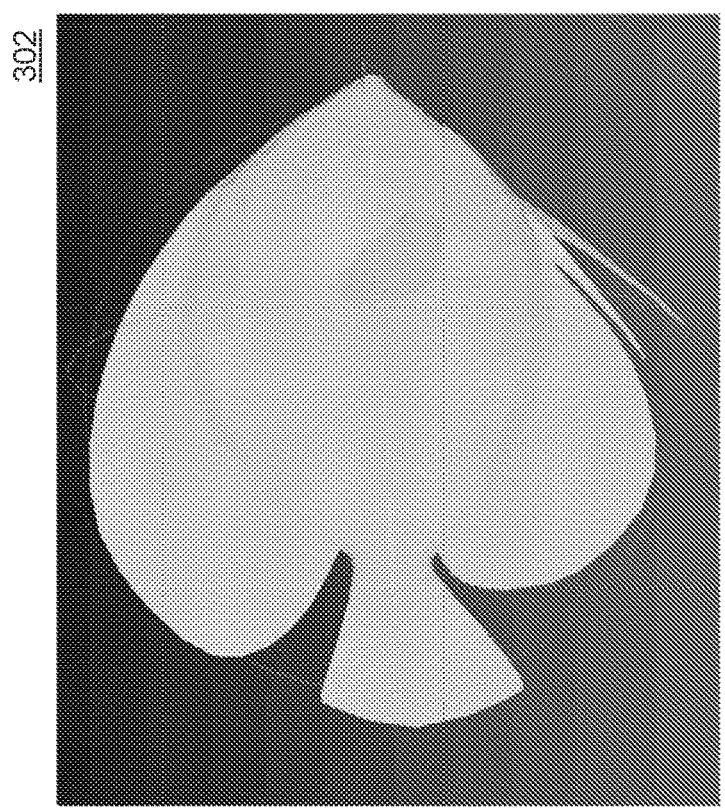
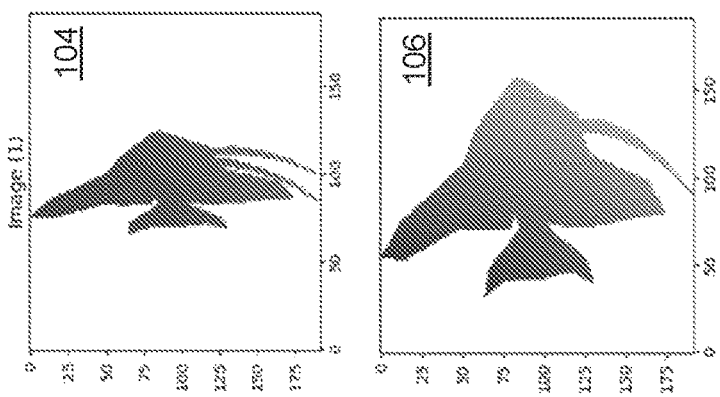
FIG. 3

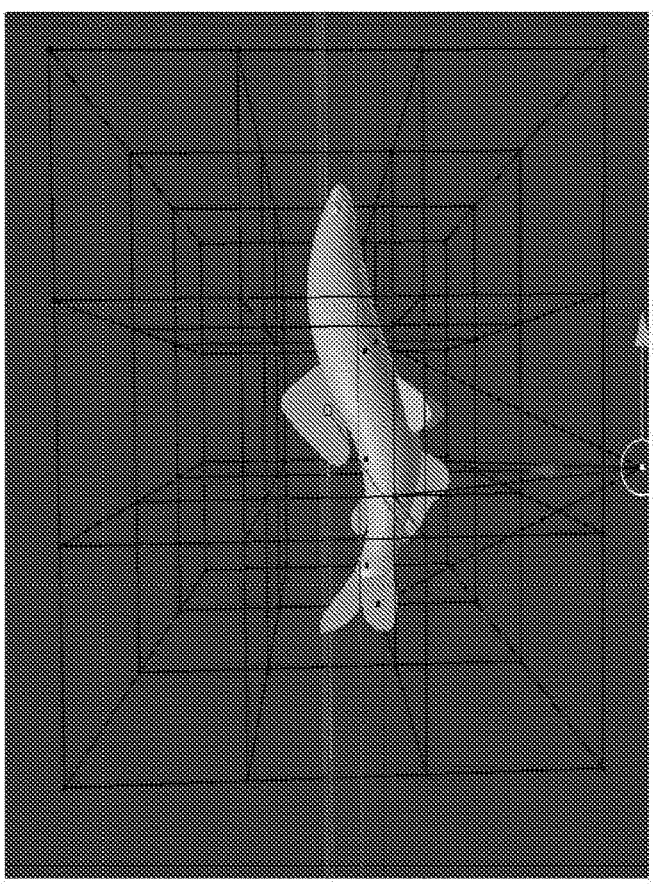
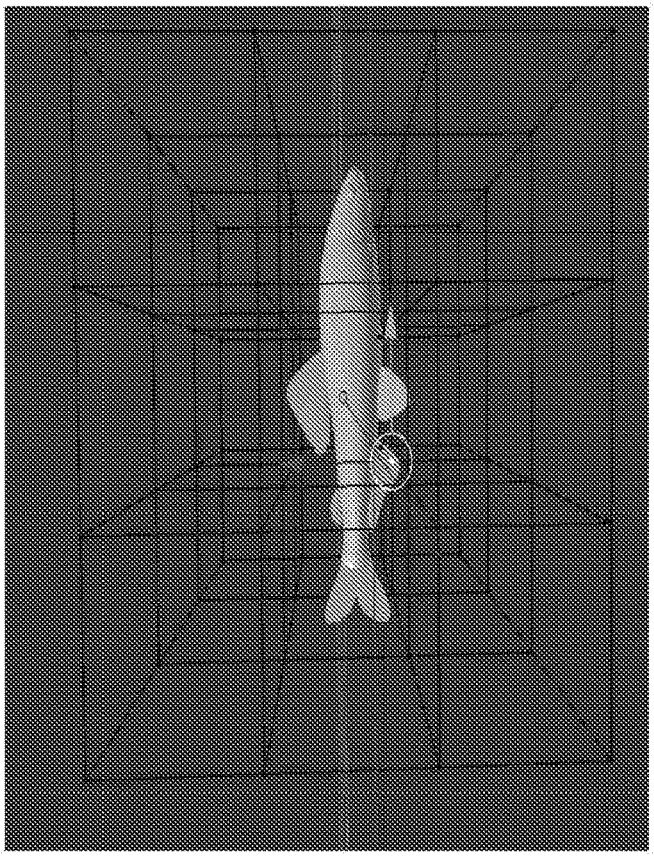
FIG. 4

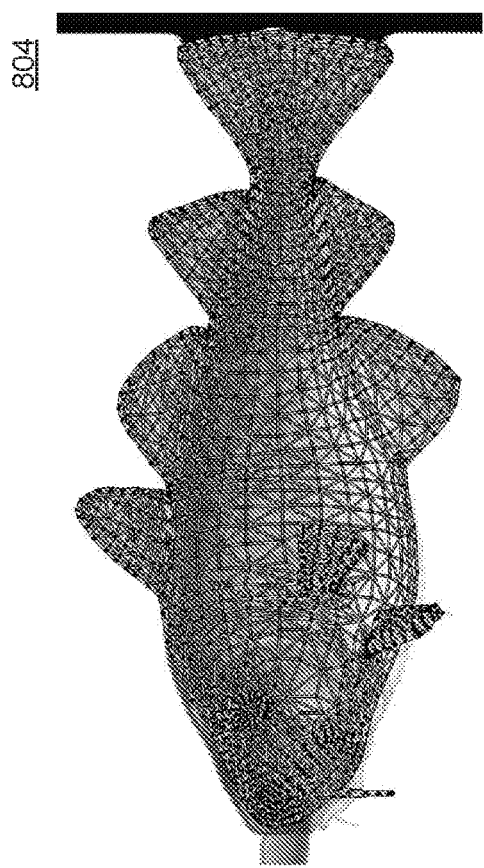
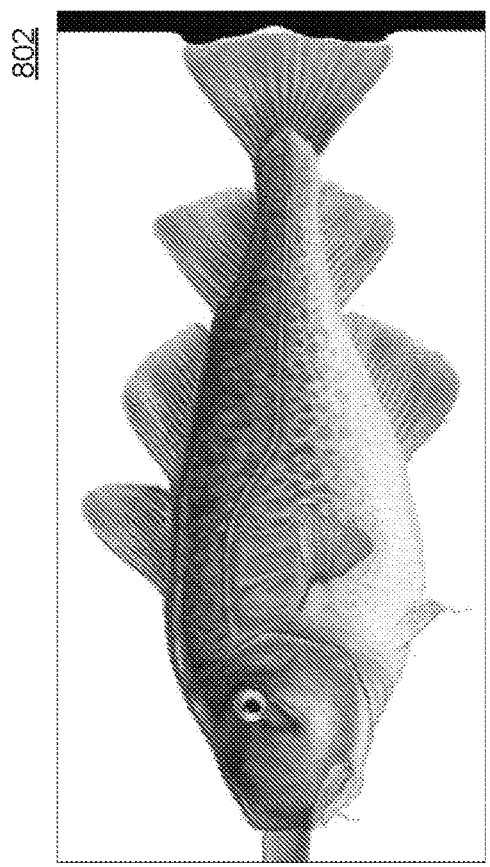
FIG. 8

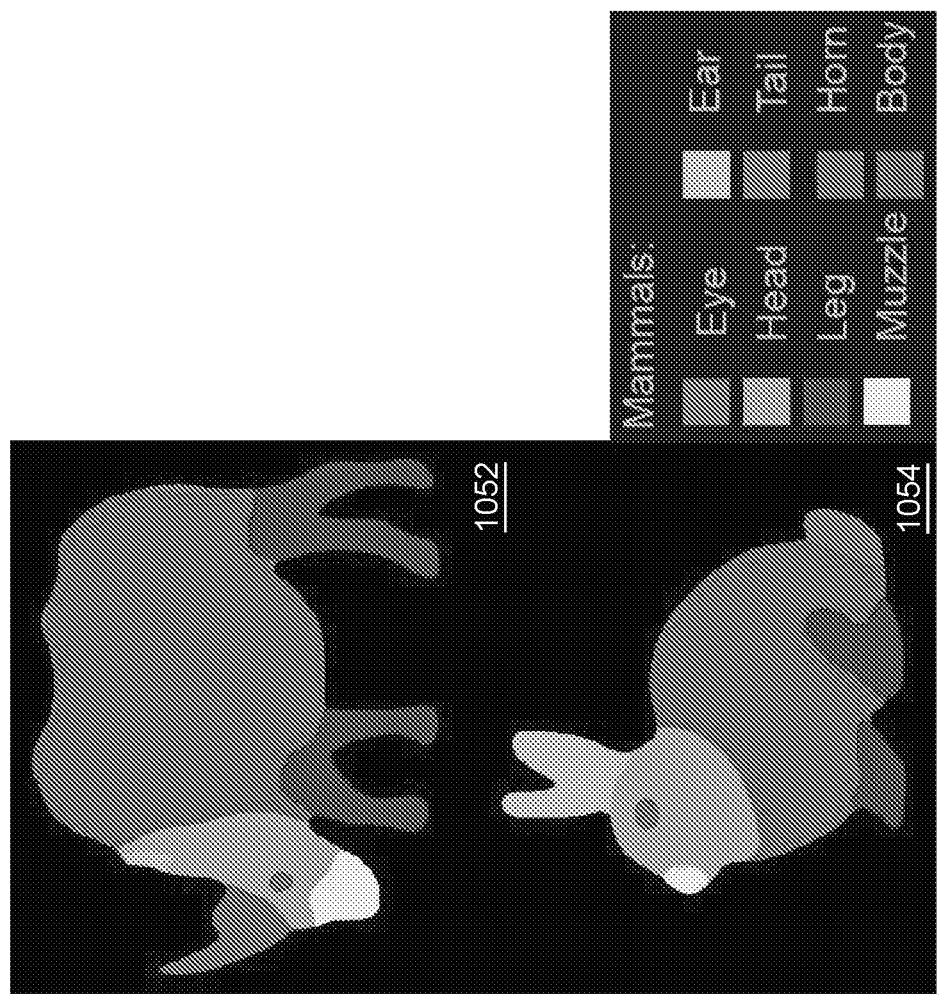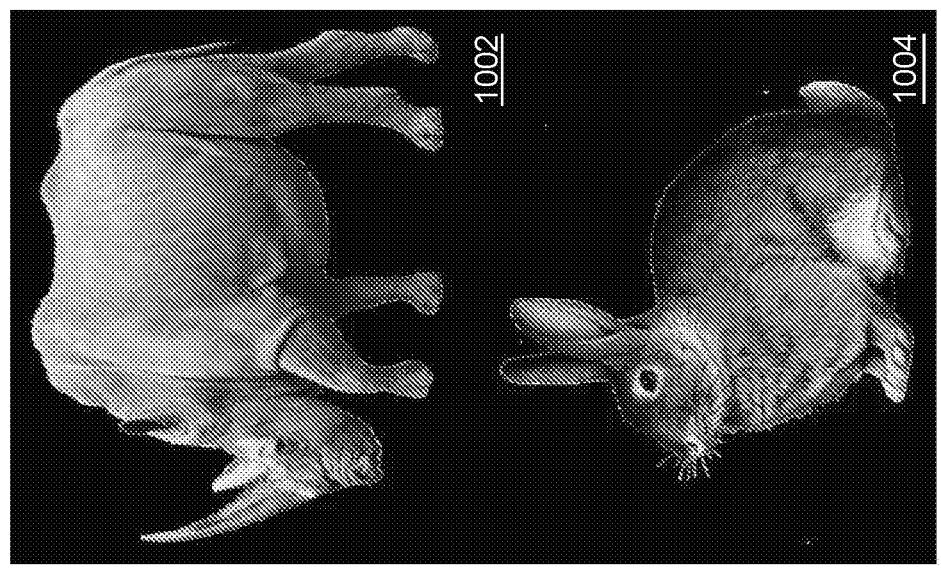
FIG. 10

FIG. 12      1200

SYSTEMS AND METHODS FOR ASSET GENERATION IN IMMERSIVE COGNITION ASSESSMENTS

CROSS REFERENCE TO RELATED APPLICATIONS

The present application is a continuation application under 35 U.S.C. § 120 of U.S. Patent application Ser. No. 16/449,259, filed Jun. 21, 2019, now U.S. Pat. No. 10,909,746, which claims the benefit under 35 U.S.C. § 119(e) as a non-provisional of U.S. Provisional Patent Application Ser. No. 62/688,963, filed Jun. 22, 2018 and entitled "SYSTEMS AND METHODS FOR IMMERSIVE COGNITIVE ASSESSMENTS," and U.S. Provisional Patent Application Ser. No. 62/801,614, filed Feb. 5, 2019 and entitled "SYSTEMS AND METHODS FOR ASSET GENERATION IN IMMERSIVE COGNITIVE ASSESSMENTS." U.S. patent application Ser. No. 16/449,259, U.S. Provisional Patent Application Ser. No. 62/688,963, and U.S. Provisional Patent Application Ser. No. 62/801,614 are hereby incorporated herein by reference in their entirety.

BACKGROUND

Traditional standardized cognitive assessments primarily evaluate content mastery or domain knowledge, processing speed, and memory. The College Entrance Examination Board, now the College Board, was established in 1923 to define a set of college admission standards through the dissemination of the Scholastic Aptitude Test (SAT). In 1959, the American College Test (ACT) was released as an alternative to the SAT. Both the ACT and the SAT focus on standardized content in mathematics, writing, science, and other subject-specific areas to create objective metrics. While widely adopted across the United States, these assessments reveal little about an individual's specific cognitive abilities or predicted college performance.

In response to the shortcomings in both the methodology and substance of traditional standardized college admissions tests, employers have adopted other traditional cognitive ability or intelligence tests in an effort to glean more predictive insights on applicants' cognitive profiles. However, these assessments, like standardized admissions tests, also focus on content mastery or domain knowledge, processing speed, and memory. These factors ignore the increasing need to develop and measure capabilities required by the 21st-century workforce.

Though conventional assessment providers may administer digital assessments, their assessments are susceptible to cheating and hacking attempts.

SUMMARY

In some aspects, to develop an assessment robust to cheating, some embodiments of the described systems and methods use an automated asset generation pipeline in the context of different scenarios provided in simulation-based assessments.

In some aspects, systems, methods, and/or non-transitory computer-readable storage media are provided for receiving a two-dimensional input image of an asset; encoding, using a first statistical model, the input image into a latent vector; and generating, using a second statistical model, at least one depth image from the latent vector, wherein pixel values in the at least one depth image correspond to coordinates of a point cloud.

In some embodiments, the system selects, using a third statistical model, a template corresponding to the at least one depth image, wherein an output of the third statistical model is a probability representing likelihood that a given template is geometrically similar to the point cloud of the at least one depth image.

In some embodiments, the system deforms the selected template into the point cloud of the at least one depth image by defining a grid of control points inside a unit cube; embedding the selected template inside the unit cube; providing location of control points to act as handles for deformation of the unit cube, including points occupied by the selected template; and interpolating the location of points in the unit cube warped by the control points.

In some embodiments, the system applies, using a fourth statistical model, a texture to the deformed template, wherein the at least one depth image is input representing an unpainted 3D model and a textured 3D model is output representing a corresponding painted 3D model.

In some embodiments, the third statistical model includes one or more convolutional layers followed by one or more linear layers to regress to a probability distribution over one or more templates.

In some embodiments, the first statistical model includes one or more convolutional layers followed by a fully-connected layer, and wherein an output of a last layer of the first statistical model is taken as mean and standard deviation of normal distribution from which the latent vector is sampled.

In some embodiments, the second statistical model includes a fully-connected layer followed by one or more deconvolutional layers, wherein one or more channels of output of a last layer of the second statistical model are taken as depth values, and wherein a last channel of the output of the last layer of the second statistical model is put through a sigmoid activation and taken as the mask.

In some embodiments, a loss function for the first statistical model and/or the second statistical model is based on an output of a third statistical model applied to the at least one depth image, wherein the third statistical model predicts a probability that the at least one depth image is real.

In some embodiments, a loss function for the first statistical model and/or the second statistical model is based on an output of a third statistical model applied to the latent vector, wherein the third statistical model predicts a probability that the latent vector was sampled from a unit normal distribution.

In some embodiments, the pixel values of the at least one depth image include RGB values and/or a mask channel, wherein the RGB values correspond to (x,y,z) position in 3D space and the mask channel indicates whether or not a point occupies that pixel, and wherein the point cloud is constructed from the at least one depth image by identifying all pixels with mask=1 and placing a paint at 3D coordinates (x,y,z)=(r,g,b).

In some aspects, a system comprising at least one computer hardware processor and at least one non-transitory computer-readable storage medium is provided. The non-transitory computer-readable storage medium stores processor-executable instructions that, when executed by the at least one computer hardware processor, cause the at least one computer hardware processor to perform receiving a two-dimensional input image of an asset; encoding, using a first statistical model, the input image into a latent vector; and generating, using a second statistical model, at least one depth image from the latent vector, wherein pixel values in the at least one depth image correspond to coordinates of a point cloud.

In some embodiments, the processor-executable instructions cause the at least one computer hardware processor to further perform selecting, using a third statistical model, a template corresponding to the at least one depth image, wherein an output of the third statistical model is a probability representing likelihood that a given template is geometrically similar to the point cloud of the at least one depth image.

In some embodiments, the processor-executable instructions cause the at least one computer hardware processor to further perform deforming the selected template into the point cloud of the at least one depth image by defining a grid of control points inside a unit cube; embedding the selected template inside the unit cube; providing location of control points to act as handles for deformation of the unit cube, including points occupied by the selected template; and interpolating the location of points in the unit cube warped by the control points.

In some embodiments, the processor-executable instructions cause the at least one computer hardware processor to further perform applying, using a fourth statistical model, a texture to the deformed template, wherein the at least one depth image is input representing an unpainted 3D model and a textured 3D model is output representing a corresponding painted 3D model.

In some embodiments, the third statistical model includes one or more convolutional layers followed by one or more linear layers to regress to a probability distribution over one or more templates.

In some embodiments, the first statistical model includes one or more convolutional layers followed by a fully-connected layer, and wherein an output of a last layer of the first statistical model is taken as mean and standard deviation of normal distribution from which the latent vector is sampled.

In some embodiments, the second statistical model includes a fully-connected layer followed by one or more deconvolutional layers, wherein one or more channels of output of a last layer of the second statistical model are taken as depth values, and wherein a last channel of the output of the last layer of the second statistical model is put through a sigmoid activation and taken as the mask.

In some embodiments, a loss function for the first statistical model and/or the second statistical model is based on an output of a third statistical model applied to the at least one depth image, wherein the third statistical model predicts a probability that the at least one depth image is real.

In some embodiments, a loss function for the first statistical model and/or the second statistical model is based on an output of a third statistical model applied to the latent vector, wherein the third statistical model predicts a probability that the latent vector was sampled from a unit normal distribution.

In some embodiments, the pixel values of the at least one depth image include RGB values and/or a mask channel, wherein the RGB values correspond to (x,y,z) position in 3D space and the mask channel indicates whether or not a point occupies that pixel, and wherein the point cloud is constructed from the at least one depth image by identifying all pixels with mask=1 and placing a paint at 3D coordinates (x,y,z)=(r,g,b).

In some aspects, at least one non-transitory computer-readable storage medium is provided. The non-transitory computer-readable storage medium stores processor-executable instructions that, when executed by the at least one computer hardware processor, cause the at least one computer hardware processor to perform receiving a two-dimensional input image of an asset; encoding, using a first statistical model, the input image into a latent vector; and generating, using a second statistical model, at least one depth image from the latent vector, wherein pixel values in the at least one depth image correspond to coordinates of a point cloud.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The patent or application file contains at least one drawing executed in color. Copies of this patent or patent application publication with color drawing(s) will be provided by the Office upon request and payment of the necessary fee.

Various non-limiting embodiments of the technology will be described with reference to the following figures. It should be appreciated that the figures are not necessarily drawn to scale.

FIG. 3 shows an example for selecting a template corresponding to one or more depth images, in accordance with some embodiments of the technology described herein;

FIG. 4 shows an example for deforming a selected template into a point cloud corresponding to one or more depth images, in accordance with some embodiments of the technology described herein;

FIG. 8 shows an example of a texture image with UV mapping onto the input 3D model, in accordance with some embodiments of the technology described herein;

FIG. 10 shows a set of exemplary results of a trained statistical model performing fine-grained semantic segmentation on a set of predefined descriptors, in accordance with some embodiments of the technology described herein;

DETAILED DESCRIPTION

Figure 1:
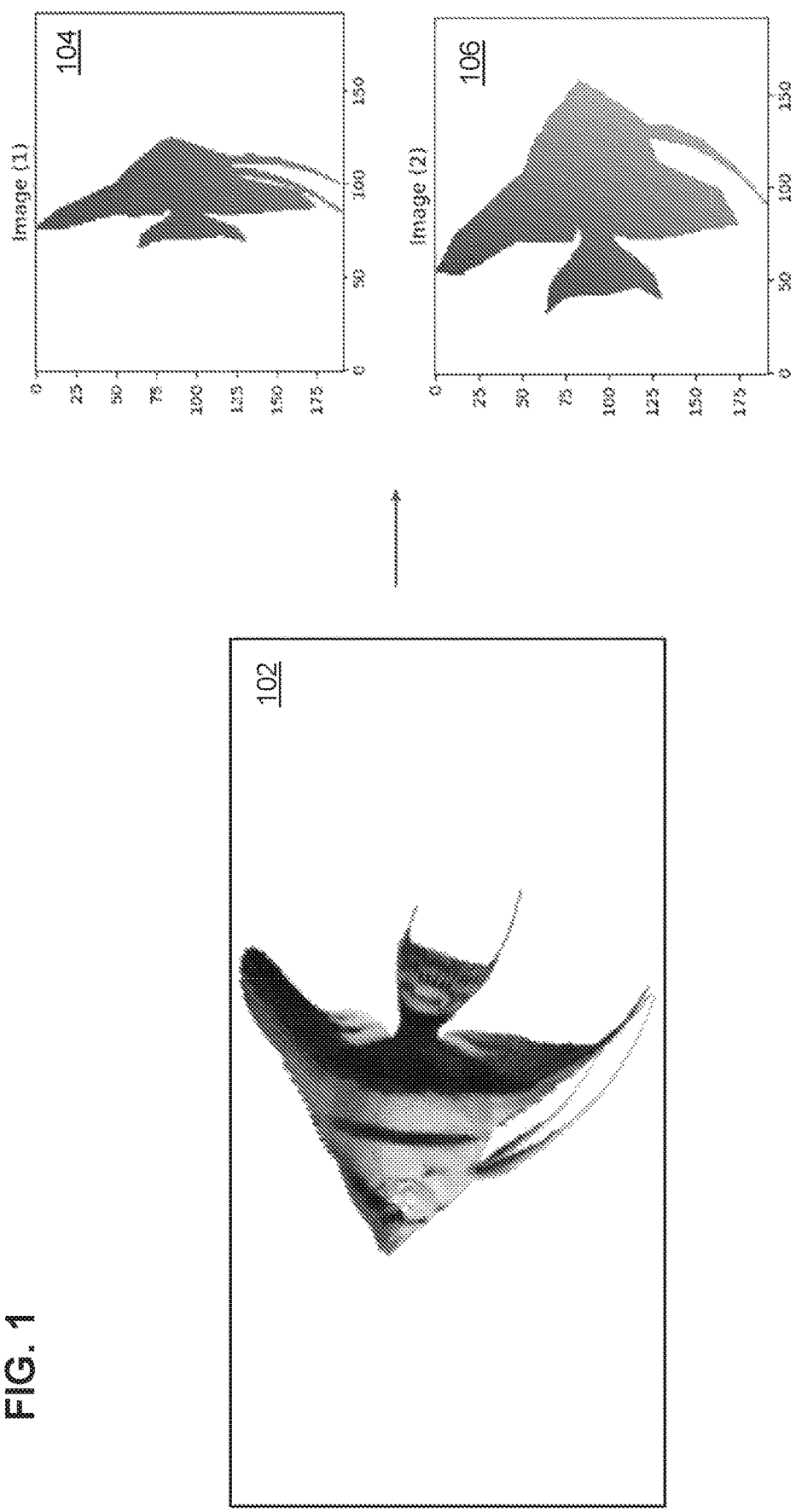
FIG. 1 shows an example for generating one or more depth images from an asset, in accordance with some embodiments of the technology described herein.

The inventors have appreciated that the rise of automation has made content mastery or domain knowledge, processing speed, and memory less relevant features of human cognition in the context of an individual's preparedness for modern work and life. Instead, higher level, complex cognitive abilities, such as problem-solving, creativity, systems thinking, and critical thinking, have become more relevant features that make a difference in the individual's preparedness for modern work and life.

In some aspects, systems and methods are provided for a simulation-based assessment that focuses on evaluating how an individual thinks instead of what he or she knows. Scenarios or tasks may be embedded within the simulation-based assessment that abstract the context of a given environment, e.g., a work environment, while maintaining opportunities for a user to portray problem-solving capabilities required by the job. Through scenarios that take place in the simulation-based assessment, details of a user's cognitive processes, not just his or her end choices, may be observed. The simulation-based assessment may accordingly discount the high value placed on memory and processing speed in traditional cognitive assessments, such as the SAT and the ACT.

In some embodiments, because skills like "critical thinking" can happen in many contexts requiring different modes and degrees of intensity, simulation-based assessments may bring to life contexts that mirror realistic scenarios that are dynamic, real-time adaptive, and/or highly realistic. These scenarios may prompt complex chains of reasoning and robust mental models by offering test takers rich narratives. Creating realistic scenarios may require abstracting both daily work activities and contextual elements that comprise the real world conditions for which an assessment strives to predict future outcomes. To break daily activities down into components for constructing tasks, granular descriptors, termed "bones," may be used as atomic units behind task designs. Bones may include a verb, object, and adjective or adjective phrase.

In some embodiments, designing a scenario may require stringing together sequences of bones in combinations that are both theoretically sound, meaning their sequence offers insight into constructs of interest, and sensible given whatever abstracted context, termed "skin," in which the scenario takes place. The skin of a scenario may dictate possible scenario construction as well as potential setting-induced biases that could obfuscate test-takers' true skill level. In selecting a skin dexterous and complex enough may be selected to represent a wide range of contexts in which problem-solving skills required mimic those required in real-world scenarios. To ensure the culmination of bones and underlying constructs represent whole problem-solving spaces as they exist on the job, vignettes of real scenarios may be mapped to preliminary task designs. Contextual characteristics—details of situational constraints, objectives, time horizons, information availability—may be diagnosed to ensure the conditions under which test-takers are performing problem-solving skills are structurally aligned with real-world situations.

In some embodiments, the simulation-based assessment includes one or more scenarios embedded in an abstracted natural world environment. The natural world setting may limit bias and offer an accessible context for a global population, regardless of background and prior knowledge. Regardless of geography, field of study, gender, or ethnicity, all test-takers have some basic understanding of plants, animals, the weather, concepts that serve as useful components to designing complex scenarios. The assessment may require a user to interact with a series of challenges involving terrain, plants, and wildlife within the natural world setting. For example, in one scenario, a user may be required to identify impending environmental threats in an ecosystem given certain evidence.

In some embodiments, no element of the narrative being presented in a scenario may violate reality because doing so would penalize a test-taker's reasonable mental models for how the world works and in turn, would mistake confusion around our natural world narratives with inability to perform skills of interest. One or more artificial rules and logic about how aspects of the simulation work may be implemented to avoid any egregious violations of common expectations. For example, giraffes live in savannas not in the mountains, and penguins eat small fish not deer. In some embodiments, beyond having a narrative and details within the simulation environment that make sense, conceptual parity among building blocks for assessment scenarios and real-world scenarios may be implemented. As an example, the concept of "profit" may be translated into an abstraction similar in nature but logical as a component to a natural world scenario. "Profit" is a composite abstraction, so the analog in a natural world simulation scenario involving, for example, a spreading disease, may be the concept of "transmission," also a composite concept with an underlying mathematical expression defining the concept.

In some embodiments, the inventors have recognized that variation in the distinct views and scenes for different versions of scenarios need to be data-driven. The system may generate distinct views and scenes for different versions of scenarios using the logic associated with potential animals, plants, and terrain features in ways that adhere to human expectations. Further, the inventors have recognized that assets that are informed by the data need to be realistic. The system may account for the properties of each asset slotted to populate the scene. For example, in the generated scenario, animals that should swarm, swarm, and animals that should fly, fly, while animals that should mingle and meander, navigate the terrain as they would in real life. Everything less obvious in our daily perception of nature, plants, rocks, or the slope of terrain, may adhere to real-world rules as well so that the background of scenes in scenarios stays in the background of assessment.

The inventors have recognized that providing variation in the distinct views and scenes for different versions of scenarios and providing assets that are realistic can be time-consuming to create from scratch and/or prohibitively expensive to purchase. In some embodiments, in order to provide a scalable approach to generate distinct views and scenes for different versions of scenarios, the system generates assets using 2D to 3D reconstruction, or taking a single image as an input and representing the object of interest in three dimensional space as the output. For example, the system may use a type of neural network called a Generative Adversarial Network (GAN) to take an input image and generate a 3D point cloud, an estimate of the spatial coordinates the object occupies in three dimensional space. In some embodiments, a point cloud alone may not yield a walking, eating, or sleeping animal for the virtual world scenario. The point cloud may be transformed to a smooth mesh, then given a texture (skin, color, and luminosity), and finally, animated, all automatically using an asset generation pipeline. Further details on representing and generating 3D object shapes with dense point clouds may be found in Chen-Hsuan Lin, Chen Kong, and Simon Lucey, Learning Efficient Point Cloud Generation for Dense 3D Object Reconstruction, arXiv:1706.07036, 2017, which is incorporated herein by reference in its entirety. In some embodiments, the system may train the neural network, such as the GAN, with AdamOptimizer, an algorithm for first-order gradient-based optimization of stochastic objective functions based on adaptive estimates of lower-order moments. Further details on AdamOptimizer may be found in Diederik P. Kingma and Jimmy Lei Ba, Adam: A Method for Stochastic Optimization, *International Conference on Learning Representations* (*ICLR*), 2015, which is incorporated herein by reference in its entirety.

FIGS. 1-5 show at least some stages of an asset generation pipeline to transform single 2D images into fully textured, animated 3D models. For example, by generating assets, costs associated with a traditional art and animation team may be reduced. In another example, because it may take some time to generate assets, there is no latency if they are precomputed. In some embodiments, generated assets may be enhanced offline by an artist to ensure that they look realistic. In some embodiments, the asset generation pipeline may be used to generate an asset from a stock image, for which there is neither multiple perspectives of the same image nor perspective consistency between images. In some embodiments, multiple input images may be used to leverage the information from having full perspective coverage.

In some embodiments, the system may receive a two-dimensional input image of an asset. In some embodiments, a deep convolutional network may be trained to encode 2D images and generate depth images, which are used to recreate a 3D point cloud. In some embodiments, a single image from any perspective is provided as input to the network, which outputs one or more depth images, where the RGB values correspond to the xyz coordinates of a point cloud. The number of depth images may be arbitrary. However, a minimum number may be needed to reconstruct a detailed point cloud due to memory constraints. In some embodiments, the system may be advantageously perform computations in terms of point clouds instead of voxels. A voxel representation of an object may be more memory-intensive, and it may be difficult to convert it to a mesh as compared to a point cloud representation of the object. FIG. 1 shows an example for generating one or more depth images from an asset, in accordance with some embodiments of the technology described herein. In FIG. 1, an image 102 of a fish is used to generate a first depth image 104 and a second depth image 106, each from a different perspective.

In some embodiments, the system may encode, using a first statistical model, the input image into a latent vector. In some embodiments, the system may use a first statistical model including an image encoder to encode an input image into a latent vector. The image encoder may include a series of convolutional layers with relu activations followed by a fully-connected layer. The output of the last layer may be taken as the mean and standard deviation of normal distribution from which the latent vector is sampled. For example, the encoder may include five convolutional layers each with stride=(2,2), kernel=(3,3), and having output channels of 128, 192, 256, 384, and 512 respectively, and a fully-connected layer with 1192 output channels (the first 596 are taken as the mean and the second 596 are taken as the standard deviations for the normal distribution to be sampled from).

Figure 2:
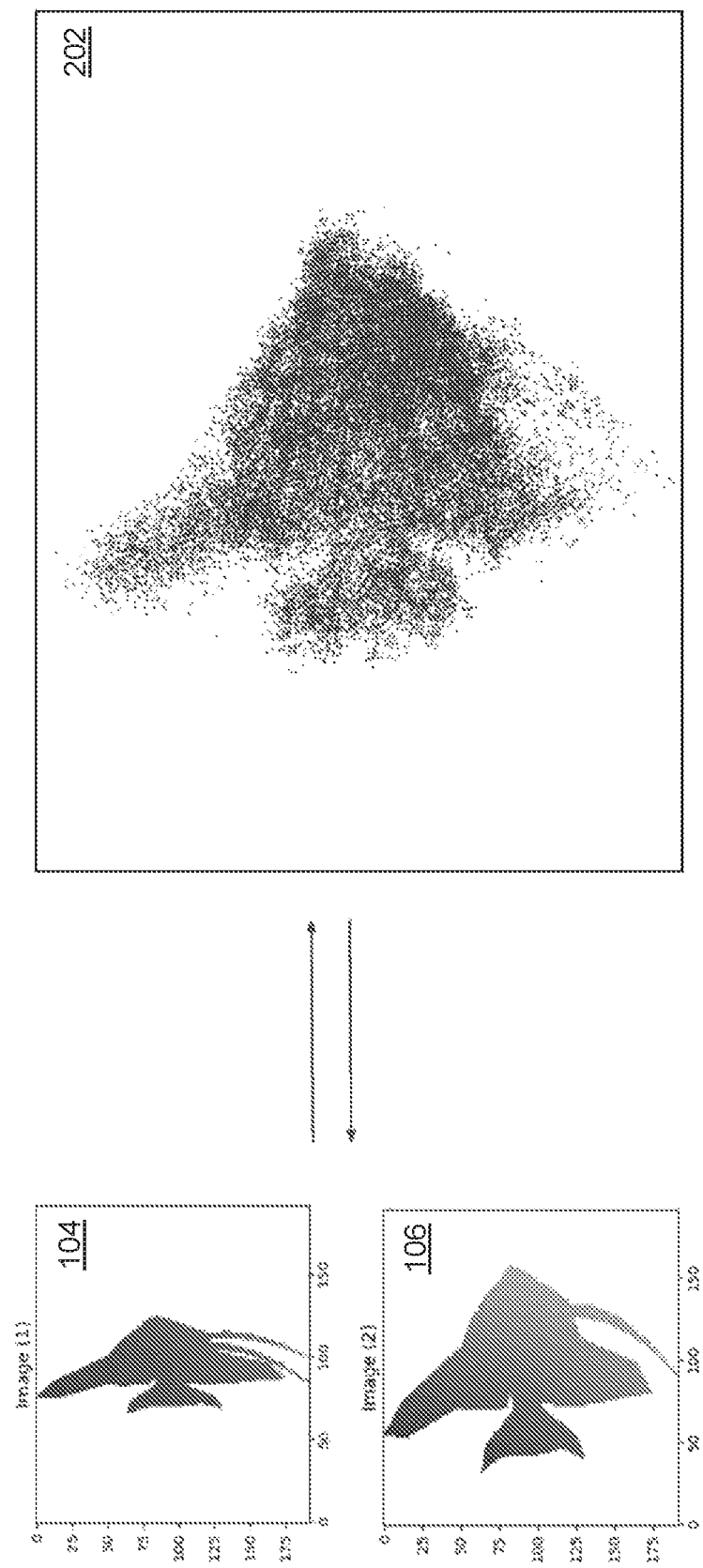
FIG. 2 shows an example for generating a point cloud from one or more depth images, in accordance with some embodiments of the technology described herein.

In some embodiments, the system may generate, using a second statistical model, at least one depth image from the latent vector, wherein pixel values in the at least one depth image correspond to coordinates of a point cloud. In some embodiments, the system may use a second statistical model including a generator to produce one or more depth images from the input latent vector. The generator may include a fully-connected layer followed by a series of 2D deconvolutional layers (with a branch for each of the N perspectives). The first three channels of the output of the last deconv layer may be taken as the depth values while the last channel may be put through a sigmoid activation and taken as the mask. For example, the generator may include a fully-connected layer with 18432 output channels, then reshaped to image of shape (6,6,512), and five deconvolutional layers with stride=(2,2), kernel=(3,3) and output shapes of (12,12,384), (24,24,256), (48,48,192), (96,96,128), and (192,192,4) respectively. FIG. 2 shows an example for generating a point cloud from one or more depth images, in accordance with some embodiments of the technology described herein. In FIG. 2, a point cloud 202 is generated from the first depth image 104 and the second depth image 106. Optionally, the point cloud 202 may be used to vice versa to reconstruct the first depth image 104 and the second depth image 106.

In some embodiments, the system may use a discriminator to predict probability that a given depth image is real (instead of being produced by a generator network). The discriminator may include a series of convolutional layers with relu activations followed by two fully-connected layers, the first with relu activation and second with sigmoid activation. For example, the discriminator may include three convolutional layers all with stride=(2,2) and with kernels (5,5), (4,4), and (3,3) respectively, and two fully-connected layers, first with 64 output channels and second with 1 output channel. In some embodiments, the system may use a code discriminator to predict probability that a given latent vector was sampled from unit normal distribution vs. produced by an encoder network. The code discriminator may include four fully-connected layers, the first three with relu activations and final with sigmoid activation, and four fully-connected layers, the first three with 750 output channels and the fourth with 1 output channel.

In some embodiments, the discriminator uses the following loss function:
cross_entropy(D(x_real),1+cross_entropy(D(x_fake), 0).

In some embodiments, the code discriminator uses the following loss function:
cross_entropy(CD(l_real), 1)+cross_entropy(CD(l_fake), 0), where l_real is a latent vector sampled from unit normal and l_fake is the latent vector obtained from encoding the input image.

In some embodiments, the generator and/or encoder use the following loss function:
cross_entropy(D(x_fake), 1)+cross_entropy(CD(l_fake), 1)+mse(x_real, x_fake), where D(x_fake) is output of discriminator with input generated depth images, CD(l_fake) is output of code discriminator given latent vector obtained from encoding input image and the last term is the mean squared error between real and generated depth images.

In some embodiments, the system may select, using a third statistical model, a template corresponding to the at least one depth image, wherein an output of the third statistical model is a probability representing likelihood that a given template is geometrically similar to the point cloud of the at least one depth image. In some embodiments, one or more depth images from the reconstructed point cloud are provided to the third statistical model, which outputs probability distribution over a database of high-quality templates. The probability may represent the likelihood that a given template is "geometrically similar" to the point cloud. In some embodiments, the third statistical model includes a classifier having a series of convolutional layers followed by linear layers to regress to a probability distribution over templates. For example, the classifier may include three convolutional layers with relu activations each of stride=(2, 2); kernels of (5,5), (4,4), and (3,3) respectively; output channels of 64, 128, and 256 respectively, a fully-connected layer with 256 output channels and relu activation, a dropout layer with keep probability of 0.4, and a fully-connected layer with sigmoid activation and output channels equal to number of templates. This output may be interpreted as probability that each template model is the best choice for the given input.

In some embodiments, the classifier uses the following loss function:

cross_entropy(true_labels, predicted_labels), where predicted labels are the probabilities predicted by the classifier that each template is the correct one for the given input.

FIG. 3 shows an example for selecting a template corresponding to one or more depth images, in accordance with some embodiments of the technology described herein. In FIG. 3, the first depth image 104 and the second depth image 106 are used to predict the closest template, e.g., template 302.

In some embodiments, the system may deform the selected template into the point cloud of the at least one depth image. FIG. 4 shows an example for deforming a selected template into a point cloud corresponding to one or more depth images, in accordance with some embodiments of the technology described herein. In FIG. 4, moving a control point, as shown in 402, causes the template mesh to deform, as shown in 404.

In some embodiments, a grid of control points may be defined inside the unit cube, and a template mesh may be embedded inside this space. The location of the control points may act as handles for the deformation of the entire space, including points occupied by the template mesh. Free-form deformation may be performed using Bernstein polynomials to interpolate the location of points in the space warped by the control points. In some embodiments, the system may deform the selected template into the point cloud of the at least one depth image by defining a grid of control points inside a unit cube, embedding the selected template inside the unit cube, providing location of control points to act as handles for deformation of the unit cube including points occupied by the selected template, and/or interpolating the location of points in the unit cube warped by the control points.

In some embodiments, a selected template or template mesh may be deformed to fit a target point cloud using free-form deformation governed by similarity metrics. In some embodiments, to encourage the free-form deformation process to deform, e.g., each fin of a fish, into the corresponding fin of the target, fins are automatically segmented and matched between template and target. In some embodiments, the Jacobian of the free-form deformation represents how much space is expanding/contracting in a neighborhood of a point. The Jacobian may be used to ensure that the deformation has no self-intersections. The Jacobian may be determined explicitly, then coded in a parallelizable way. Without parallelization, the computation may only be approximated because of memory constraints.

In some embodiments, if the template mesh was animated by rigging, the template mesh may inherit that animation even after it has been deformed. Rigging is a technique used in animation for representing a 3D model using a series of interconnected digital bones. Specifically, rigging refers to the process of creating the bone structure of the 3D model. In some embodiments, after learning a free-form deformation from the template mesh to the point cloud, the system may perform the same free-form deformation on the template mesh's bones, effectively transferring the rigging to the deformed template, and assign the same bone weights to each deformed vertex that it had before the deformation. For example, a 3D model where a deer has been deformed into a horse may inherit the deer's animation. In some embodiments, after learning a free-form deformation from a rigged template mesh to the point cloud, the deformed template may inherit the rig of the undeformed template by assigning each deformed vertex its corresponding bone weights before deformation. The system may also transfer a rig between a template and any given mesh by finding the K nearest vertex neighbors in the template for each vertex in the given mesh, and assigning weights based on an average weighted by the distance to the K neighbors.

Figure 5:
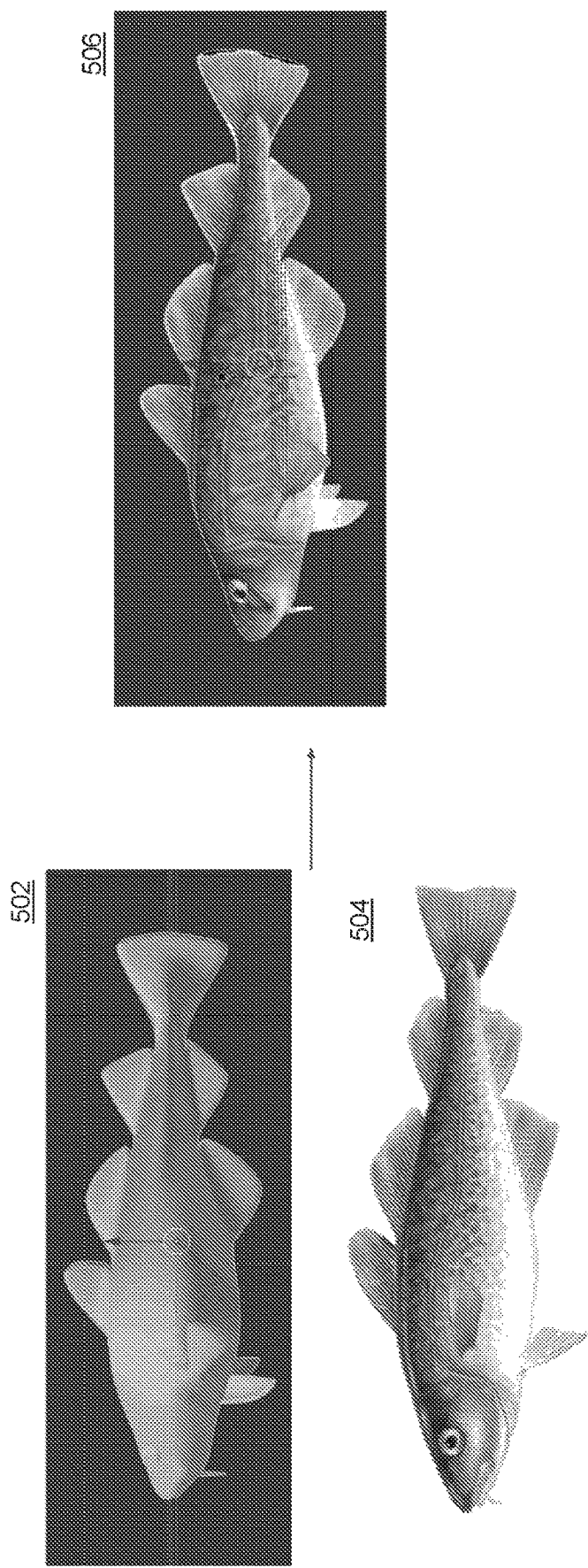
FIG. 5 shows an example for applying a texture to the deformed template, in accordance with some embodiments of the technology described herein.

In some embodiments, the system may apply, using a fourth statistical model, a texture to the deformed template, wherein the at least one depth image is input representing an unpainted 3D model and a textured 3D model is output representing a corresponding painted 3D model. FIG. 5 shows an example for applying a texture to the deformed template, in accordance with some embodiments of the technology described herein. In FIG. 5, a depth image 502 and the corresponding input image 504 are used to generate a textured 3D model 506.

In some embodiments, a 2D image and depth image encoding of a mesh may be input into the model which then outputs colored depth images. The mesh may be painted by assigning to each vertex the color of the pixel in the depth image into which it projects.

In some embodiments, an input image and/or depth image representing an unpainted 3D model are provided to the fourth statistical model, which outputs a textured 3D model. The textured 3D model may include a texture image with UV mapping onto the input 3D model. UV mapping is the 3D modeling process of projecting a 2D image to a 3D model's surface for texture mapping. The letters "U" and "V" can denote the axes of the 2D texture where "X," "Y," and "Z" denote the axes of the 3D object in model space. The system may use the fourth statistical model to translate input and depth images into descriptor space. The system may construct an optical flow from the input image descriptor to the depth image descriptors. The system may apply the optical flow to warp the input image to the depth image. The system may optionally use a post processing neural network or another suitable statistical model to cleans up the warped input image.

In some embodiments, an input image and/or depth image representing an unpainted 3D model are provided to the fourth statistical model, which outputs a textured 3D model. The textured 3D model may include a texture image with UV mapping onto the input 3D model. The system may use the fourth statistical model, which may include a descriptor net, to translate input and depth images into descriptor space. The system may use the fourth statistical model, which may include a flow regressor, to learn a flow from the input image descriptor to the depth image descriptors. The system may apply the flow to warp the input image to the depth image. The system may use the fourth statistical model, which may include a post processing neural network or another suitable statistical model, to clean up the warped input image.

Figure 6:
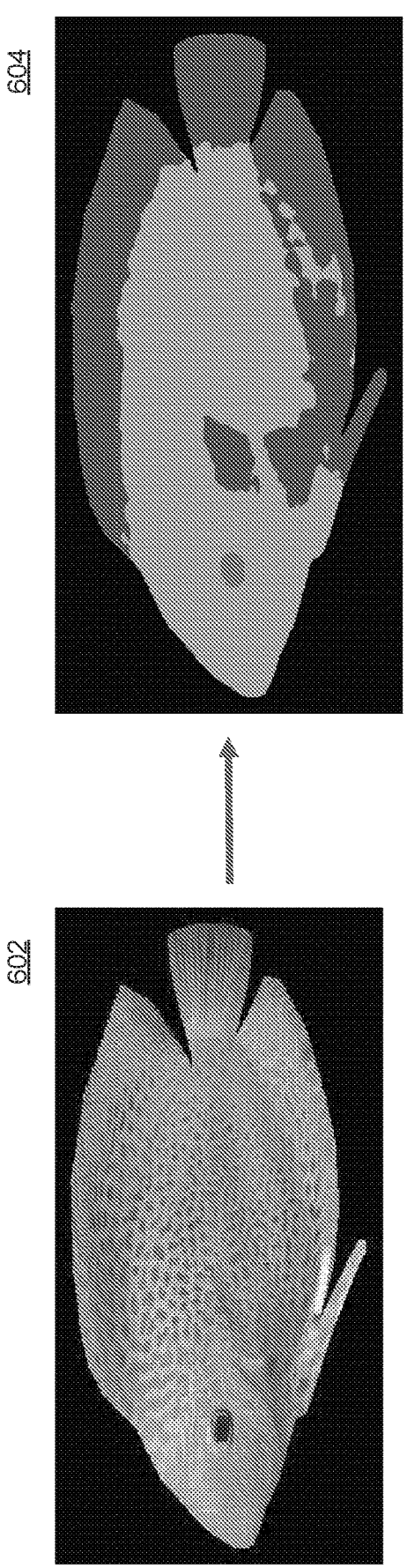
FIG. 6 shows an example of a descriptor net which may be included in a statistical model for applying a texture to the deformed template, in accordance with some embodiments of the technology described herein.

FIG. 6 shows an example of a descriptor net which may be included in a statistical model for applying a texture to the deformed template, in accordance with some embodiments of the technology described herein. The descriptor net may translate input and depth images, e.g., 602, into descriptor space, e.g., 604. For example, the descriptor net may include an encoder having six convolutional layers each with kernel=(5,5) and stride=(2,2), and with output channels of 64, 128, 256, 512, 512, and 512 respectively, and each conv layer is followed by a leaky relu activation and batch norm. For example, the descriptor net may include a generator having six deconvolutional layers each with kernel=(5,5) and stride=(2,2), and output shapes of (8, 16, 512), (16, 32, 512), (32, 64, 256), (64, 128, 128), (128,256,64), (256, 512, 1), conv layers have relu activations and batch norm, the first two conv layers are followed by dropout layers with keep probability of 50%, and skip connections connect corresponding layers of the encoder and the generator (e.g. the output of encoder layer 1 is concatenated with the output of the second to last generator layer along the channels axis and this result is fed into the final layer of the generator).

In some embodiments, the system may use a discriminator to predict, given an input image and a corresponding descriptor, the probability that this descriptor is real (instead of one produced by the generator). For example, the discriminator may include four conv layers all with kernel=(5, 5) and stride=(2,2), except for final conv layer which has stride=(1,1), output channels of 16, 32, 64, and 128 respectively, each conv layer has leaky relu activation and batch norm, and a fully-connected layer without 1 output channel and sigmoid activation. The discriminator may use the following loss function:

cross_entropy(D(x_real), 1)+cross_entropy(D(x_fake), 0), where D(x_real) is the output of the discriminator with input of real descriptors and D(x_fake) is output of discriminator with input of generated descriptors.

In some embodiments, the generator and/or encoder use the following loss function:

cross_entropy(D(x_fake), 1)+cross_entropy(x_fake, x_real), where descriptors are binary and cross entropy is used for the comparison to the real descriptor as seen in the second term.

In some embodiments, the system may use an eight-stage regressor model, or another suitable n-stage regressor model, to predict flows between descriptors at increasing resolutions. Losses may be defined such that coarser features (e.g., boundaries) are encouraged to line up at earlier stages. The input at each stage may be the descriptor for the input image and the descriptor for the depth image. The output at each stage may be a predicted flow field over pixels in the input image descriptor, where each flow vector specifies how to displace a pixel. This may be used to warp the input image. In some embodiments, the resolutions at each stage may be determined according to: (1/alpha)*height×width for alpha in {32, 24, 16, 12, 8, 4, 2, 1}. In some embodiments, the number of iterations at each stage may be {300, 300, 300, 300, 200, 200, 100, 50}. In some embodiments, the following loss functions are used, where weights are over the channels of the images:

Weighted Color Loss=mean(weights*(warped_image−target_image)^2)

Smooth Loss=total_variation(flow_field)

Figure 7:
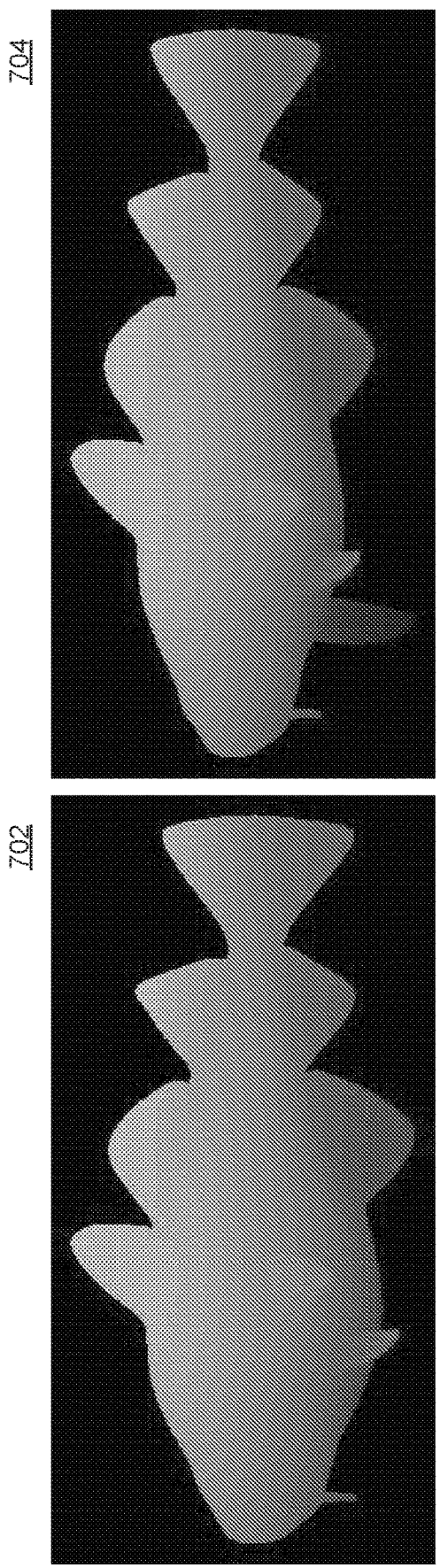
FIG. 7 shows an example where perspective projection is used, in accordance with some embodiments of the technology described herein.

In some embodiments, to ensure that as much of the 3D model is in view in the depth image, a perspective projection may be used. FIG. 7 shows an example where perspective projection is used, in accordance with some embodiments of the technology described herein. In some embodiments, the perspective projection may be used in the manner illustrated below:

Let p=(x,y,z) be a point on the object, p_screen= (x_screen, y_screen, z_screen) be the position of the screen, and p_light=(x_light, y_light, z_light) be the position of the light source.

Let the x axis be perpendicular to the screen and going through the light source.

The position on the screen to which p projects is then:

$x\_final = x\_screen$ $y\_final = [(x\_screen - x\_light)/(x - x\_light)] * (y - y\_light)$ $z\_final = [(x\_screen - x\_light)/(x - x\_light)] * (z - z\_light)$ In FIG. 7, by changing the location of the light source and screen, the warping in the projection may be controlled to include more or less of the object as illustrated in images 702 and 704. For example, with the light source infinitely far away, this object may reduce to a flat parallel light projection.

FIG. 8 shows an example of a texture image with UV mapping onto the input 3D model, in accordance with some embodiments of the technology described herein. Given the input image, e.g., 802, aligned with the target depth image, the texture may be mapped onto the 3D model, e.g., 804. Vertices may be assigned UV coordinates by tracing which pixels in the depth image project down to which vertices in the 3D model. These coordinates may indicate the pixel location in the texture image to which a vertex corresponds. For example, if the texture image is of size (256, 512) and a vertex projects to the pixel at (112, 234), the UV coordinates for that vertex are (112/256, 234/512)=(0.4375, 0.457).

Figure 9:
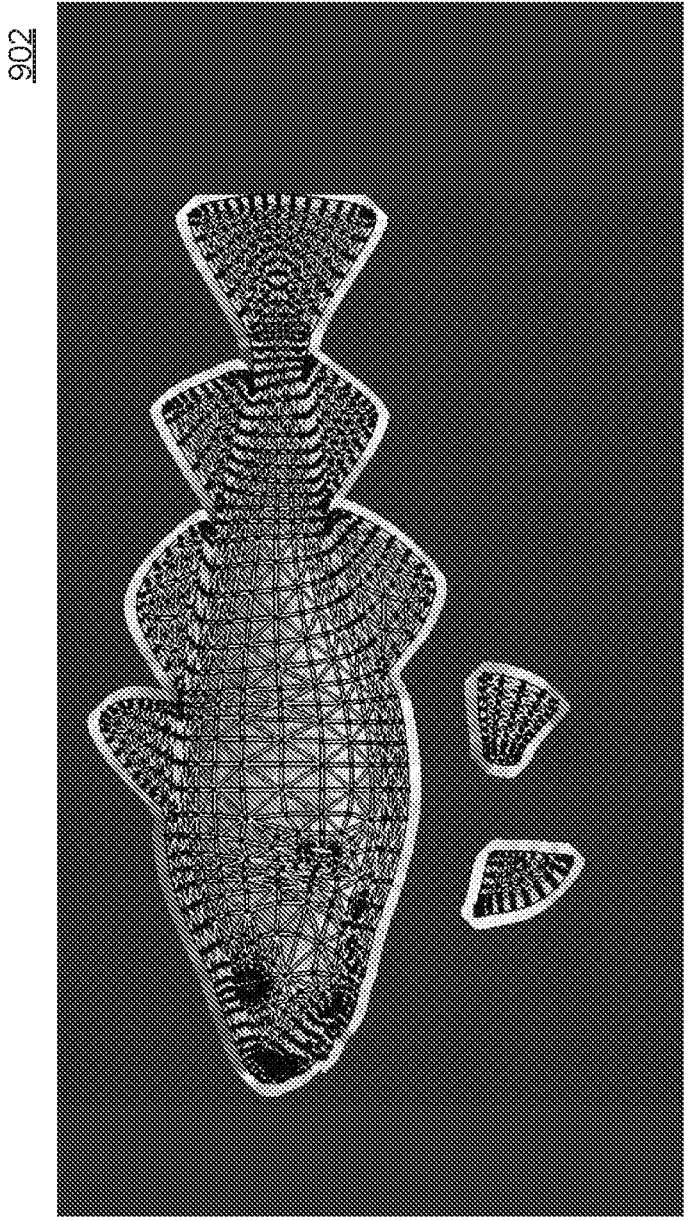
FIG. 9 shows an example for applying an improved texture to the deformed template, in accordance with some embodiments of the technology described herein.

In some embodiments, the result of the UV mapping explained with respect to FIG. 8 may be crude and contain one or more overlapping UVs (e.g., where the side fin lies on top of the body). This may make it difficult for an artist to come in and perform any manual cleanup. To resolve this issue, the new texture may be remapped using the original UV map of the template mesh. Inheriting the UV map from the template may be achieved by texturing the model with the crude UV map and then baking or including that texture into a new image using the inherited UV map. FIG. 9 shows an example for applying an improved texture to the deformed template, in accordance with some embodiments of the technology described herein. The new texture image 902 may be obtained by baking the applied texture using the inherited UV map. In some embodiments, the system may separate out overlapping regions, e.g., for easy editing, as illustrated in image 902.

In some embodiments, the fourth statistical model may include a trained statistical model that is fine-tuned to perform fine-grained semantic segmentation on sets of predefined descriptors, e.g., a dataset including animals, mammals, or fish. These descriptors may be used to guide a regression through UV space. For example, the trained statistical model may be a trained Deeplab model or another suitable model. Details on Deeplab's architecture may be found in L. Chen, G. Papandreou, I. Kokkinos, K. Murphy, and A. L. Yuille, Deeplab: Semantic Image Segmentation with Deep Convolutional Nets, Atrous Convolution, and Fully Connected CRFs, arXiv:1606.00915, 2016, which is incorporated herein by reference in its entirety.

The trained statistical model may include a deep convolutional neural network trained in the task of image classification that is re-purposed to the task of semantic segmentation by (1) transforming all the fully connected layers to convolutional layers (i.e., fully convolutional network) and (2) increasing feature resolution through atrous convolutional layers. The atrous convolution algorithm may allow for computation of responses of any layer at any desirable resolution, e.g., allowing computation of feature responses every 8 pixels instead of every 32 pixels in the original network. It may be applied post-hoc, once a network has been trained, but may also be seamlessly integrated with training. For example, considering one-dimensional signals, the output y[i] of atrous convolution of a 1-D input signal x[i] with a filter w[k] of length K is defined as: $y[i]=\sum_{k=1}^{K} x[i+r \cdot k]w[k]$. The rate parameter r corresponds to the stride with which the input signal is sampled. For example, standard convolution may be a special case for rate r=1.

Figure 11:
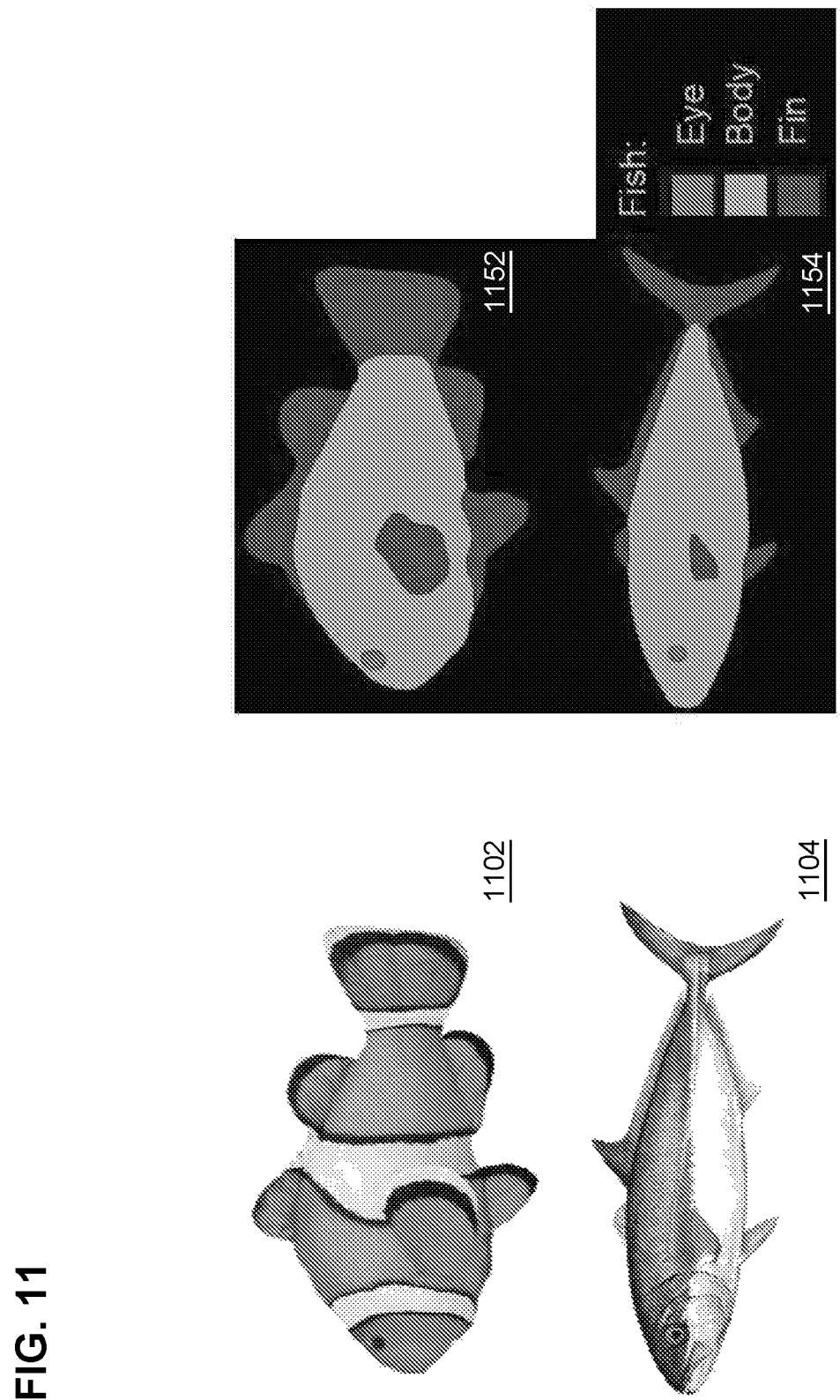
FIG. 11 shows another set of exemplary results of a trained statistical model performing fine-grained semantic segmentation on a set of predefined descriptors, in accordance with some embodiments of the technology described herein.

FIGS. 10-11 show sets of exemplary results of a trained statistical model performing fine-grained semantic segmentation on a set of predefined descriptors. For example, the number of output classes of a standard Deeplab model may be changed to match the number of descriptors (e.g., 8 for mammals, or 3 for fish) and trained with a learning rate of 1E-4. In both figures, the left side shows the input image, and the right side shows results from the trained statistical model. In FIG. 10, the left side shows input images 1002, 1004, and the right side shows images 1052, 1054 resulting from the trained statistical model processing images 1002, 1004. In this example, the defined descriptor set for "Mammals" includes Eye, Head, Leg, Muzzle, Ear, Tail, Horn, and Body. In FIG. 11, the left side shows input images 1102, 1104, and the right side shows images 1152, 1154 resulting from the trained statistical model processing images 1102, 1104. In this example, the defined descriptor set for "Fish" includes Eye, Body, and Fin.

In some embodiments, the UV regressor, which may use the results from a fine-tuned Deeplab model, may attempt to "cast a net" over a given image in UV space. Instead of warping the image to fit the mesh, the system may learn how to project the mesh onto the image. The input image may be the same image used for 3D reconstruction, so this regressor may be run as part of an automated 3D reconstruction pipeline. In some embodiments any image with a sufficiently large portion of the animal visible may be usable, so multiple textures may be applied to the same mesh. The input may be a novel 2D Image A and a Source Mesh B. B may be segmented with the same descriptors that the Deeplab model was trained on to produce images. The output may be a UV mapping from the vertices of B to A. It is not required that B have a predefined UV map, but if it does, the UVs that the UV regressor produces can be inherited into the old UV map, e.g., as described above with respect to FIG. 9.

In some embodiments, the fourth statistical model may include an encoder network of 7 stacked graph convolutional layers of sizes 12, 24, 48, 96, 192, 384, 2. Every convolutional layer may be followed by a ReLU nonlinearity, with the exception of the last layer. The first convolutional layer may take as input the mesh adjacency matrix and its 3D vertices. The last layer may be trained to predict a displacement vector in 2D UV space for each vertex, which is added to the initial UV coordinates of the vertices of the model. The graph convolutions used may be those defined in Thomas N. Kipf and Max Welling, Semi-Supervised Classification with Graph Convolutional Networks, *International Conference on Learning Representations (ICLR)*, 2017, which is incorporated herein by reference in its entirety, or other suitable graph convolutions.

In some embodiments, training the UV regressor may include projecting the mesh vertices to UV space along its plane of symmetry, and retaining the information about each projected vertex's descriptor. The input image may be run through the descriptor net to obtain each pixel's descriptor. For the loss computation, the pixels of the input image may be treated as points in UV space and N points may be sampled for each descriptor j, where Qj may denote the set of points for a given descriptor j.

In some embodiments, the training of the UV regressor may further include running an affine regression to find a suitable (e.g., optimal) affine transformation from the mesh's UV coordinates to the input image. The regression may use AdamOptimizer (learning rate 0.01) to minimize the descriptor loss, which is defined as:

Descriptor loss: Let P_f denote the centroids of the faces of the predicted UVs, and let P_v denote the vertices predicted UVs. The label loss is the sum over k,j of chamfer_distance(P_kj, Q_j) fork in {v,f} and for corresponding descriptors j.

In some embodiments, the training of the UV regressor may further include running the UV regressor, starting from the UV coordinates predicted above. The regression may attempt to minimize the descriptor loss with AdamOptimizer (e.g., learning rate 0.0001).

Figure 12:
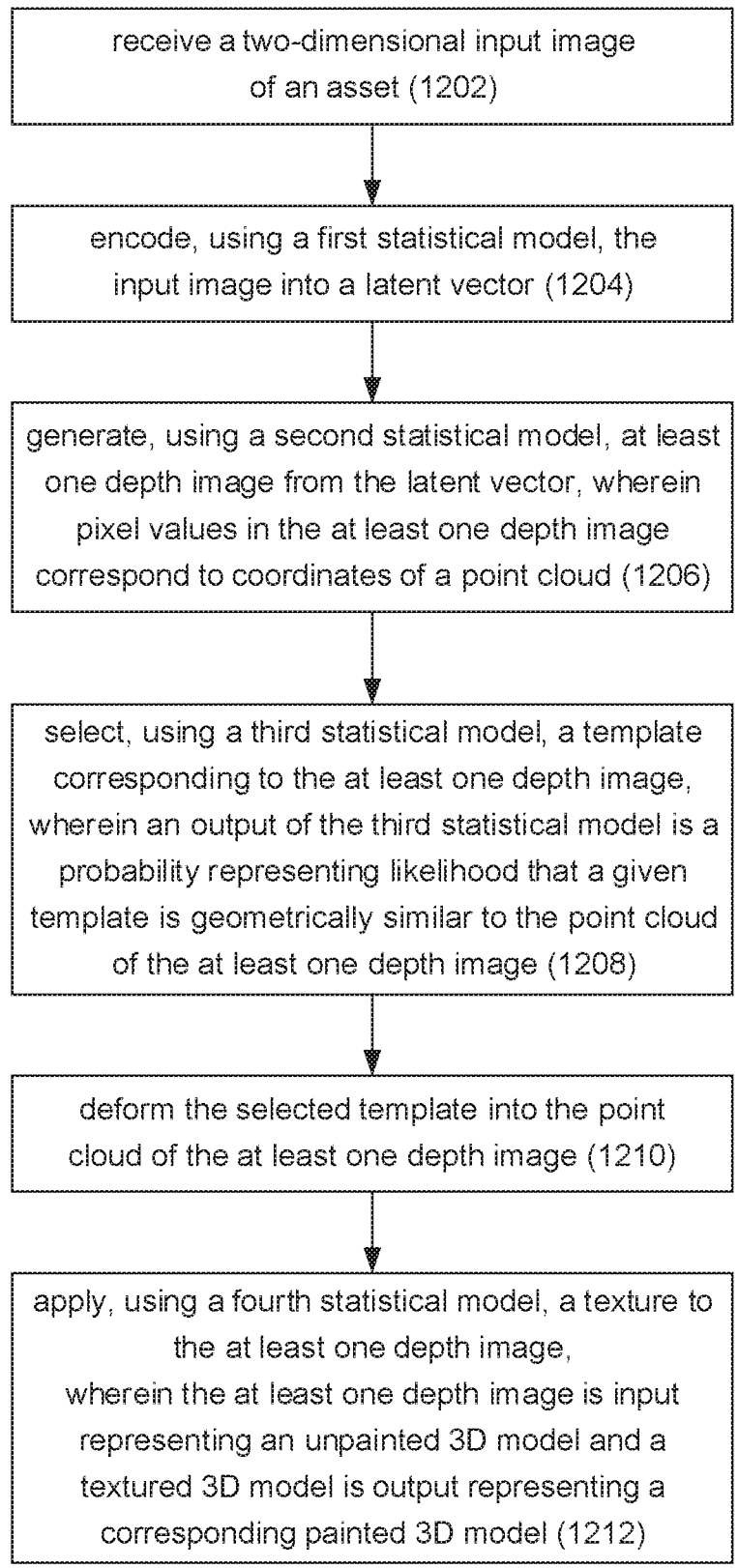
FIG. 12 is a flow diagram of an illustrative process for generating a three-dimensional reconstruction from a two-dimensional image of an asset, in accordance with some embodiments of the technology described herein.

FIG. 12 is a flow diagram of an illustrative process for generating a three-dimensional reconstruction from a two-dimensional image of an asset, in accordance with some embodiments of the technology described herein.

At 1202, the system receives a two-dimensional input image of an asset. For example, image 102 in FIG. 1 shows a two-dimensional input image of an asset.

At 1204, the system encodes, using a first statistical model, the input image into a latent vector.

In some embodiments, the first statistical model includes one or more convolutional layers followed by a fully-connected layer. An output of a last layer of the first statistical model is taken as mean and standard deviation of normal distribution from which the latent vector is sampled.

In some embodiments, a loss function for the first statistical model is based on an output of a third statistical model applied to the at least one depth image. The third statistical model predicts a probability that the at least one depth image is real.

In some embodiments, a loss function for the first statistical model is based on an output of a third statistical model applied to the latent vector. The third statistical model predicts a probability that the latent vector was sampled from a unit normal distribution.

At 1206, the system generates, using a second statistical model, at least one depth image from the latent vector. The pixel values in the at least one depth image correspond to coordinates of a point cloud. For example, images 104 and 106 in FIG. 2 show depth images corresponding to point cloud 202.

In some embodiments, the pixel values of the at least one depth image include RGB values and/or a mask channel. The RGB values correspond to (x,y,z) position in 3D space and the mask channel indicates whether or not a point occupies that pixel. The point cloud may be constructed from the at least one depth image by identifying all pixels with mask=1 and placing a paint at 3D coordinates (x,y,z)=(r,g,b).

In some embodiments, the second statistical model includes a fully-connected layer followed by one or more deconvolutional layers. One or more channels of output of a last layer of the second statistical model are taken as depth values. A last channel of the output of the last layer of the second statistical model is put through a sigmoid activation and taken as the mask.

In some embodiments, a loss function for the second statistical model is based on an output of a third statistical model applied to the at least one depth image. The third statistical model predicts a probability that the at least one depth image is real.

In some embodiments, a loss function for the second statistical model is based on an output of a third statistical model applied to the latent vector. The third statistical model predicts a probability that the latent vector was sampled from a unit normal distribution.

At 1208, the system selects, using a third statistical model, a template corresponding to the at least one depth image. An output of the third statistical model is a probability representing likelihood that a given template is geometrically similar to the point cloud of the at least one depth image. For example, template 302 in FIG. 3 is selected as corresponding to depth images 104 and 106.

In some embodiments, the third statistical model includes one or more convolutional layers followed by one or more linear layers to regress to a probability distribution over one or more templates.

At 1210, the system deforms the selected template into the point cloud of the at least one depth image. For example, moving a control point in FIG. 4, as shown in 402, causes the template mesh to deform, as shown in 404.

In some embodiments, the system defines a grid of control points inside a unit cube. The system embeds the selected template inside the unit cube. The system provides location of control points to act as handles for deformation of the unit cube, including points occupied by the selected template. The system interpolates the location of points in the unit cube warped by the control points.

At 1212, the system applies, using a fourth statistical model, a texture to the deformed template. The at least one depth image is input representing an unpainted 3D model and a textured 3D model is output representing a corresponding painted 3D model. For example, the textured 3D model 506 in FIG. 5 is generated from a depth image 502 and/or the corresponding input image 504.

In some embodiments, as a user interacts with the assessment, information may be recorded regarding how he or she approaches the task and/or the processes in which the user solves and engages in during the task. The recorded information may include the user's telemetry data, e.g. mouse movements, clicks, choices, timestamps, and other suitable telemetry data. The user's telemetry data may be analyzed to examine the user's cognitive processes and/or overall performance. In addition to analysis of the user's telemetry data for correct or incorrect answers, the user's telemetry data may be analyzed to understand how the user solved a problem and/or what strategies he or she engaged in to solve the problem. For at least some embodiments, the inventors have recognized that this novel approach to cognitive testing in a given domain, e.g., the hiring domain, may provide an abundance of information to better assess which candidates are likely to succeed at a company.

In some embodiments, the simulation-based assessment is deployed locally in a secure, proctored environment. In some embodiments, the simulation-based assessment is deployed remotely via timed releases where users may participate across any number of locations. In some embodiments, to ensure no two assessments are the same, artificial intelligence (AI) approaches are applied to the process of scenario generation. Data-driven properties referenced across different scenarios may be varied in order to build unique versions of those scenarios. Each user who takes the simulation-based assessment may receive a unique task instance that, on the surface, is varied by its individual properties, complexity, and visual design, while structurally every task instance remains consistent in its assessment. For at least some embodiments, the inventors have recognized that while cheating and gaming remains a significant challenge facing many traditional cognitive assessments, the AI and data-driven architecture of the simulation-based assessment may protect against cheating and gaming of the assessment. For example, because each user who takes the simulation-based assessment may receive a unique task instance, it may be harder for a given user taking the simulation-based assessment to benefit from another user's responses to one or more tasks in the simulation-based assessment.

The inventors have appreciated because conventional assessment providers administering digital, scenario-based assessment items typically work with primitive, if any, forms of automated item generation, their assessments are susceptible to cheating and hacking attempts. In some embodiments, to develop an assessment robust to cheating, the system uses the above described automated asset generation in the context of scenarios in its simulation-based assessments. The system may keep the underlying "bones" of a scenario and the basic logic and heuristics driving the scenario the same across versions. In different scenarios, the system may use different data for driving the scenario; all the particulars pertaining to each variable. Because these variables all contribute to an overall problem and solution space, evaluation of equivalency, the system may evaluate the relative difficulty of any two versions of an item using a supervised artificial intelligence process. The supervised artificial intelligence process may explore and exploit the possibility spaces in generated versions of different assessment scenarios. The supervised artificial intelligence process may learn to explore possible behaviors and exploit heuristics, helping to understand which variations of a given scenario require specific types of thinking and strategies.

In some embodiments, the system may implement a consistent calibration method for reconciling predicted complexity for scenarios with actual difficulty distributions to leverage automated item generation at scale across different scenarios. To derive the relationship between computational complexity and difficulty distributions, the system may receive as many reasonable parameters as possible to account for system variable, components of scenarios that our system serves up deterministically, and human variables, what test-takers do in a scenario. Using more data throughout test development and iteration, the system may implement complexity estimator algorithms that get better at approximating human behavior.

In some embodiments, assessment scores are determined to quantify how a user's actions, timestamps, and performance within each scenario related to various cognitive constructs. Cognitive science, educational psychology, and learning science theories may guide the mapping of each score to relevant constructs. In some embodiments, the scores may focus both on the product (i.e., right or wrong) and on the process (i.e., how did they get there, what choices did they make, how many mistakes did they correct), which is more nuanced than traditional cognitive assessments.

In some embodiments, the score development process includes outlining an expert model for each scenario. The expert models may outline an expert's expected telemetry data and corresponding evidence (e.g., efficiency and/or systematicity) for each assessment scenario. Expert models may drive evidence statements, outlining what information would need to be observed from the user in the environment to infer strong problem-solving skills. For example, in order to measure informed decision making in the tasks, an evidence statement may be created that would define what informed decision making is and how it would manifest in the assessment. In some embodiments, one or more scores are programmed using these evidence statements as the scoring parameters.

In some embodiments, the scores of the simulation-based assessment are validated against a traditional or existing cognitive assessment, such as McKinsey's Problem-Solving Test (PST). For example, in order for the assessment scores to be considered valid, the scores may be expected to have a positive correlation with scores from the PST. In some embodiments, a cognitive profile is created for each user based on one or more cognitive constructs, e.g., critical thinking, decision-making, metacognition, situational awareness, and systems thinking. Alternatively or additionally, scores from the cognitive profile may be used to validate the simulation-based assessment against a traditional or existing cognitive assessment, such as the PST.

In some embodiments, quality of the simulation-based assessment may depend on how well the assessment predicts an outcome (e.g., hiring process success, job performance, or college GPA) and the degree to which the variables behind that prediction may be explained and corroborated with both theoretical and data-driven models. For example, psychometric models, linear regression models, and/or neural networks may be used to investigate and predict outcomes. Processing data from digital scenarios may require parsing telemetry data, e.g., huge log files of user actions, into manageable fields and values. For every required user action within a scenario, a corresponding rubric may specify user behaviors and learning science constructs involved in each one.

In some embodiments, the mapping of items to underlying constructs may inform the core blueprint of psychometric Item Response Theory (IRT) models, the Q-matrix. The Q-matrix hypothesizes the relationship between each item and underlying constructs, but data from actual assessment sessions, when reconciled with learning science theory, sometimes offers alternative assessment structures that can better explain test-takers' performance. To understand the latent variable structure implied by response data, psychometricians may conduct and exploratory factor analysis, investigating which items have the most consistent performance levels for the greatest number of test-takers. In some embodiments, an exploratory factor analysis is similar to a principal component analysis. By inspecting the Q-matrix values associated with items contributing to discoverable factors, the Q-matrix may be updated to incorporate better statistical properties. Further, inspecting predictive power of each factor and the items within it against an external criterion can also suggest revisions to the underlying factor structure.

Q-matrices are one example of a psychometrics tool that can be improved upon with modern machine learning techniques. Understanding the degree to which one item score should influence a probability estimate for a test-taker's mastery of the skill or skills required by that item presents another opportunity to apply machine learning to psychometrics. In some embodiments, training a machine learning model to predict an external criterion provides a vector that acts as a weighting coefficient modifying all item-level scores. Together, the vector-imposed "weights" and the item scores may yield a predictive interpretation of assessment performance. While machine learning models can often out-perform more psychometric models on predicting external variables, the details of how a given machine learning model treated input data can be opaque.

In some embodiments, the need for massive data sets of hard-to-simulate assessment performance instances makes the challenge of inventing new measurement models that draw on the best of machine learning and psychometrics a difficult problem. As an example. deploying something like a neural network that outperforms a linear regression model may require tens of thousands of test sessions, but having the opportunity to deploy an assessment with tens of thousands of test-takers requires a useful assessment that some organization is willing to deploy towards some material ends. Alternatively or additionally, less complex models, smaller data, or both may be used in an effort to provide scores that mean something in the short term while building data needed to make greater claims with more sophisticated models at a later time.

Example Computer Architecture

Figure 13:
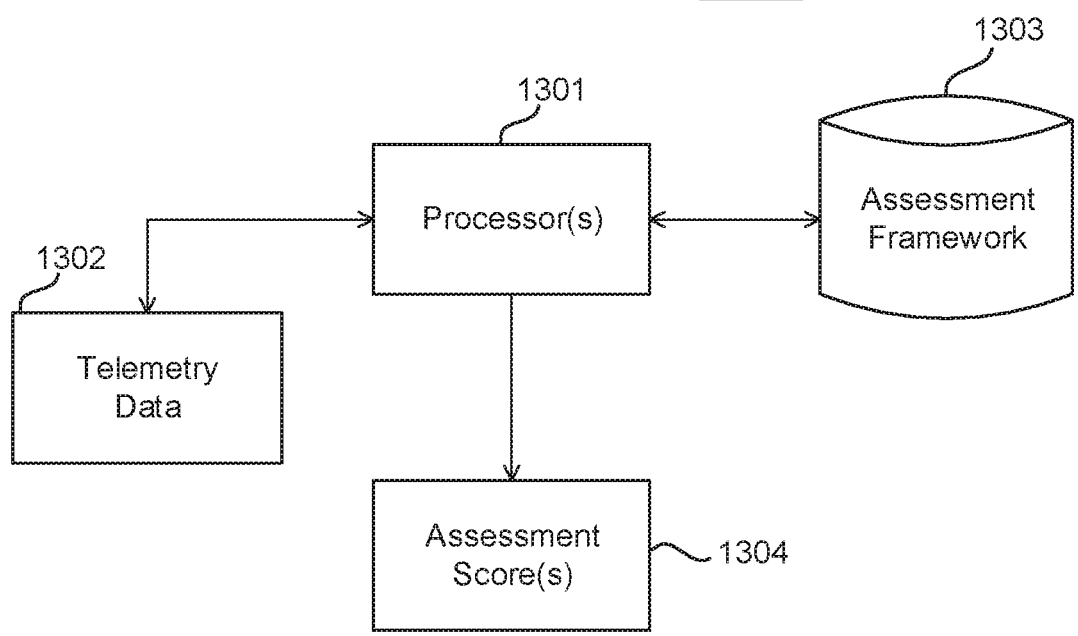
FIG. 13 shows an example implementation for performing one or more functions in connection with any of the embodiments of the technology described herein.

In some aspects, one example implementation of the described systems and methods is shown in FIG. 13. In particular, FIG. 13 shows an example implementation of a system for computing an assessment score in accordance with some embodiments of the technology described herein. In particular, system 1300 may include one or more processors 1301 that are operable to generate an assessment score for a user (e.g., element 1304). Such information may be stored within memory or persisted to storage media. In some embodiments, processors 1301 may receive the user's telemetry data 1302 including mouse movements, clicks, choices, timestamps, and other suitable telemetry data. In some embodiments, processors 1301 may receive and/or generate one or more assessment scores, using the assessment framework 1303 (e.g., related program or software), for each user's telemetry data according to at least some of the described systems and methods. Processors 1301 may be configured to execute at least some of the described systems and methods to generate the assessment score 1304 based on the telemetry data 1302 and/or the assessment framework 1303.

Figure 14:
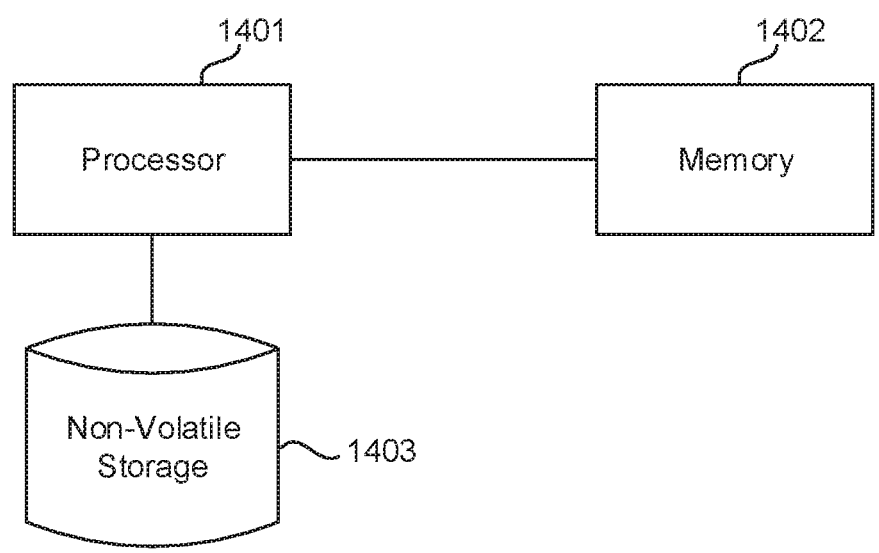
FIG. 14 shows an example computer system for executing one or more functions in connection with any of the embodiments of the technology described herein.

In some aspects, an illustrative implementation of a computing device 1400 that may be used in connection with any of the embodiments of the disclosure provided herein is shown in FIG. 14. In particular, FIG. 14 shows an example computer system for executing a simulation-based assessment in accordance with some embodiments of the technology described herein. The computing device 1400 may include one or more processors 1401 and one or more articles of manufacture that comprise non-transitory computer-readable storage media (e.g., memory 1402 and one or more non-volatile storage media 1403). The processor 1401 may control writing data to and reading data from the memory 1402 and the non-volatile storage device 1403 in any suitable manner. To perform any of the functionality described herein, the processor 1401 may execute one or more processor-executable instructions stored in one or more non-transitory computer-readable storage media (e.g., the memory 1403), which may serve as non-transitory computer-readable storage media storing processor-executable instructions for execution by the processor 1401.

In some embodiments, at least some of the described systems and methods are implemented in a cloud-based architecture. The cloud-based architecture may offer on-demand access to a shared pool of configurable computing resources (e.g. processors, graphics processors, memory, disk storage, network bandwidth, and other suitable resources). A processor in the cloud-based architecture may be operable to receive or obtain the user's telemetry data, including mouse movements, clicks, choices, timestamps, and other suitable telemetry data, and compute an assessment score for the user. A memory in the cloud-based architecture may store the user's telemetry data as well as the assessment framework (e.g., related program or software) which may be operated by the processor to compute the assessment score. In some embodiments, the cloud-based architecture may provide a graphics processor for computing the assessment score in a faster and more efficient manner compared to a conventional processor.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

All definitions, as defined and used herein, should be understood to control over dictionary definitions, and/or ordinary meanings of the defined terms.

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer to, in one embodiment, to A only (optionally including elements other than B); in another embodiment, to B only (optionally including elements other than A); in yet another embodiment, to both A and B (optionally including other elements); etc.

The phraseology and terminology used herein is for the purpose of description and should not be regarded as limiting. The use of "including," "comprising," "having," "containing," "involving," and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting.

What is claimed is:

1. A method to generate a three-dimensional reconstruction from a two-dimensional input image of an asset using at least one computer hardware processor, the method comprising:
receiving, by the at least one computer hardware processor, the two-dimensional input image of the asset;
encoding, using a first statistical model, the input image into a latent vector; and
generating, using a second statistical model, at least one depth image from the latent vector, wherein pixel values in the at least one depth image correspond to coordinates of a point cloud, wherein the second statistical model includes a fully-connected layer followed by one or more deconvolutional layers, wherein one or more channels of output of a last layer of the second statistical model are taken as depth values, and wherein a last channel of the output of the last layer of the second statistical model is taken as a mask.

2. The method of claim 1, further comprising:
selecting, using a third statistical model, a template corresponding to the at least one depth image, wherein an output of the third statistical model is a probability representing likelihood that a given template is geometrically similar to the point cloud of the at least one depth image.

3. The method of claim 2, further comprising:
deforming the selected template into the point cloud of the at least one depth image by:
defining a grid of control points inside a unit cube;
embedding the selected template inside the unit cube;
providing a location of control points to act as handles for deformation of the unit cube, including points occupied by the selected template; and
interpolating the location of points in the unit cube warped by the control points.

4. The method of claim 3, further comprising:
applying, using a fourth statistical model, a texture to the deformed template, wherein the at least one depth image is input representing an unpainted 3D model and a textured 3D model is output representing a corresponding painted 3D model.

5. The method of claim 2, wherein the third statistical model includes one or more convolutional layers followed by one or more linear layers to regress to a probability distribution over one or more templates.

6. The method of claim 1, wherein the first statistical model includes one or more convolutional layers followed by a fully-connected layer, and wherein an output of a last layer of the first statistical model is taken as mean and standard deviation of normal distribution from which the latent vector is sampled.

7. The method of claim 1, wherein the last channel of the output of the last layer of the second statistical model is put through a sigmoid activation.

8. The method of claim 1, wherein a loss function for the first statistical model and/or the second statistical model is based on an output of a third statistical model applied to the at least one depth image, and wherein the third statistical model predicts a probability that the at least one depth image is real.

9. The method of claim 1, wherein a loss function for the first statistical model and/or the second statistical model is based on an output of a third statistical model applied to the latent vector, and wherein the third statistical model predicts a probability that the latent vector was sampled from a unit normal distribution.

10. The method of claim 1, wherein the pixel values of the at least one depth image include RGB values and/or a mask channel, wherein the RGB values correspond to a (x,y,z) position in 3D space and the mask channel indicates whether or not a point occupies that pixel, and wherein the point cloud is constructed from the at least one depth image by identifying all pixels with mask=1 and placing a paint at 3D coordinates (x,y,z)=(r,g,b).

11. A system, comprising:
at least one computer hardware processor; and
at least one non-transitory computer-readable storage medium having stored thereon processor-executable instructions that, in response to execution by the at least one computer hardware processor, cause the at least one computer hardware processor to perform operations that comprise:
receiving a two-dimensional input image of an asset;
encoding, using a first statistical model, the input image into a latent vector; and
generating, using a second statistical model, at least one depth image from the latent vector, wherein pixel values in the at least one depth image correspond to coordinates of a point cloud, wherein the second statistical model includes a fully-connected layer followed by one or more deconvolutional layers, wherein one or more channels of output of a last layer of the second statistical model are taken as depth values, and wherein a last channel of the output of the last layer of the second statistical model is taken as a mask.

12. The system of claim 11, wherein the processor-executable instructions cause the at least one computer hardware processor to further perform:
selecting, using a third statistical model, a template corresponding to the at least one depth image, wherein an output of the third statistical model is a probability representing likelihood that a given template is geometrically similar to the point cloud of the at least one depth image.

13. The system of claim 12, wherein the processor-executable instructions cause the at least one computer hardware processor to further perform:
deforming the selected template into the point cloud of the at least one depth image by:
defining a grid of control points inside a unit cube;
embedding the selected template inside the unit cube;
providing a location of control points to act as handles for deformation of the unit cube, including points occupied by the selected template; and
interpolating the location of points in the unit cube warped by the control points.

14. The system of claim 13, wherein the processor-executable instructions cause the at least one computer hardware processor to further perform:
applying, using a fourth statistical model, a texture to the deformed template, wherein the at least one depth image is input representing an unpainted 3D model and a textured 3D model is output representing a corresponding painted 3D model.

15. The system of claim 12, wherein the third statistical model includes one or more convolutional layers followed by one or more linear layers to regress to a probability distribution over one or more templates.

16. The system of claim 11, wherein the first statistical model includes one or more convolutional layers followed by a fully-connected layer, and wherein an output of a last layer of the first statistical model is taken as mean and standard deviation of normal distribution from which the latent vector is sampled.

17. The system of claim 11, wherein the last channel of the output of the last layer of the second statistical model is put through a sigmoid activation.

18. The system of claim 11, wherein a loss function for the first statistical model and/or the second statistical model is based on an output of a third statistical model applied to the at least one depth image, and wherein the third statistical model predicts a probability that the at least one depth image is real.

19. The system of claim 11, wherein a loss function for the first statistical model and/or the second statistical model is based on an output of a third statistical model applied to the latent vector, and wherein the third statistical model predicts a probability that the latent vector was sampled from a unit normal distribution.

20. A non-transitory computer-readable storage medium having stored thereon processor-executable instructions that, in response to execution by the at least one computer hardware processor, cause the at least one computer hardware processor to perform operations that comprise:
receiving a two-dimensional input image of an asset;
encoding, using a first statistical model, the input image into a latent vector; and
generating, using a second statistical model, at least one depth image from the latent vector, wherein pixel values in the at least one depth image correspond to coordinates of a point cloud, wherein the second statistical model includes a fully-connected layer followed by one or more deconvolutional layers, wherein one or more channels of output of a last layer of the second statistical model are taken as depth values, and wherein a last channel of the output of the last layer of the second statistical model is taken as a mask.

* * * * *